US005936397A

United States Patent [19]

Benkert et al.

[11] Patent Number: 5,936,397

[45] Date of Patent: Aug. 10, 1999

[54] SENSOR DEVICE FOR DETERMINING ROTATIONAL SPEED AND/OR DIRECTION OF A ROTOR SHAFT AND MOUNTED ONTO THE ROTOR SHAFT WITH A RESILIENT SECURING PART

[75] Inventors: Matthias Benkert, Wuerzburg; Thomas Ziegler, Arnstein, both of Germany

[73] Assignee: Siemens Aktiengesellschaft, Munich, Germany

[21] Appl. No.: 08/762,873

[22] Filed: Dec. 12, 1996

[30] Foreign Application Priority Data

Dec. 13, 1995 [DE] Germany ........................... 195 46 595

[51] Int. Cl.[6] ................................ G01P 3/48; G01B 7/30

[52] U.S. Cl. .................... 324/173; 324/207.25; 324/262; 324/174

[58] Field of Search .......................... 324/207.11–207.26, 324/160–167, 260, 261, 262, 173, 174, 175, 179; 338/32 H, 32 R; 310/83

[56] References Cited

U.S. PATENT DOCUMENTS 5,431,414 7/1995 Fedorovich et al. ...................... 277/53

FOREIGN PATENT DOCUMENTS

| | | |
|---|---|---|
| 0359853 | 3/1990 | European Pat. Off. . |
| 0420041 | 4/1991 | European Pat. Off. . |
| 0601228 | 6/1994 | European Pat. Off. . |
| 3718047 | 12/1987 | Germany . |
| 8811966 | 8/1989 | Germany . |
| 69003884 | 12/1990 | Germany . |
| 9002149 | 8/1991 | Germany . |
| 9006935 | 11/1991 | Germany . |
| 69103729 | 5/1992 | Germany . |
| 4337390 | 4/1995 | Germany . |
| 2117572 | 10/1983 | United Kingdom . |

*Primary Examiner*—Jay M. Patidar
*Attorney, Agent, or Firm*—Sughrue, Mion, Zinn, Macpeak & Seas, PLLC

[57] ABSTRACT

In order to be able to attach a rotational-speed or direction-of-rotation transmitter, in particular in the form of a rotor (3), to the circumference of a rotor shaft (2) in a simple and reliable fashion, the rotational-speed or direction-of-rotation transmitter is connected indirectly to the rotor shaft (2) by means of at least one separate, radially resilient or elastic intermediate securing part. Preferably, at least one rubber ring (4 or 5) is provided as the intermediate securing part and is clamped onto the rotor shaft (2) or pressed into a shaft orifice of the rotor (3) expediently before final assembly, to provide a premounted unit.

24 Claims, 2 Drawing Sheets

SENSOR DEVICE FOR DETERMINING ROTATIONAL SPEED AND/OR DIRECTION OF A ROTOR SHAFT AND MOUNTED ONTO THE ROTOR SHAFT WITH A RESILIENT SECURING PART

BACKGROUND OF THE INVENTION

1. Field of the Invention

The invention relates to a sensor device for determining a rotational speed and/or a direction of rotation of a rotating shaft.

2. Description of Related Art

EP 0 601 228 (B1) discloses an electromotive drive having a sensor device for detecting the rotational speed and/or the direction of rotation of a rotor shaft. In order to avoid damage to the rotor portion of the sensor device from an excessive load produced by a form fit on the rotor shaft, the rotor is merely positioned onto the rotor shaft with a sliding fit. However, to ensure that the rotor is driven along with the rotor shaft during rotation, the rotor is provided with a positively locking, axial and tangential bearing connection to a separate securing part which is itself pressed, with a form fit, onto the rotor shaft.

3. Objects of the Invention

A first object of the invention is to fix a rotational-speed or direction-of-rotation transmitter, such as a rotor, securely onto the rotor shaft without excessive pressure loading. A further object is to reduce the outlay on production and assembly in comparison with previously known solutions, thereby containing overall costs.

SUMMARY OF THE INVENTION

These and other objects are achieved by means of the teachings of independent claims 1 and 21. Particularly advantageous refinements and embodiments of the invention are the subject matter of the dependent claims.

A sensor device for detecting rotational parameters of a rotor shaft, such as the speed or direction of rotation, according to the invention, includes:

a rotational-speed or direction-of-rotation transmitter, in particular in the form of a rotor that can be attached to the circumference of the rotor shaft; and at least one separate, radially resilient or elastic intermediate securing part which is embraced on its outer circumferential side by the rotational-speed or direction-of-rotation transmitter. The rotational-speed or direction-of-rotation transmitter is secured indirectly to the rotor shaft by means of the intermediate securing part, and rotates with the rotor shaft substantially without slippage. The intermediate securing part is preferably formed as a ring.

The device for sensing the rotational speed and/or the direction of rotation, according to the invention, permits a particularly simple intermediate securing part to be used. During the assembly process, this part can be premounted either on the rotor shaft or on the rotational-speed and/or direction-of-rotation transmitter, or both. The transmitter on the one hand and the rotor shaft on the other can be subsequently fixed in relation to one another using only small mounting and fitting forces, without excessive radial pressure load on the transmitter and without damage to the surface of the rotor shaft.

BRIEF DESCRIPTION OF THE DRAWINGS

The invention and further advantageous refinements of the invention are explained in greater detail below in the drawing with reference to schematic, exemplary embodiments, in which drawing:

FIGS. 2, 3 show two variants of the invention in a premounted condition, and FIGS. 4, 5 show two embodiments of the invention in a mounted, operational condition.

DETAILED DESCRIPTION OF THE PREFERRED EMBODIMENTS

Figure 1:
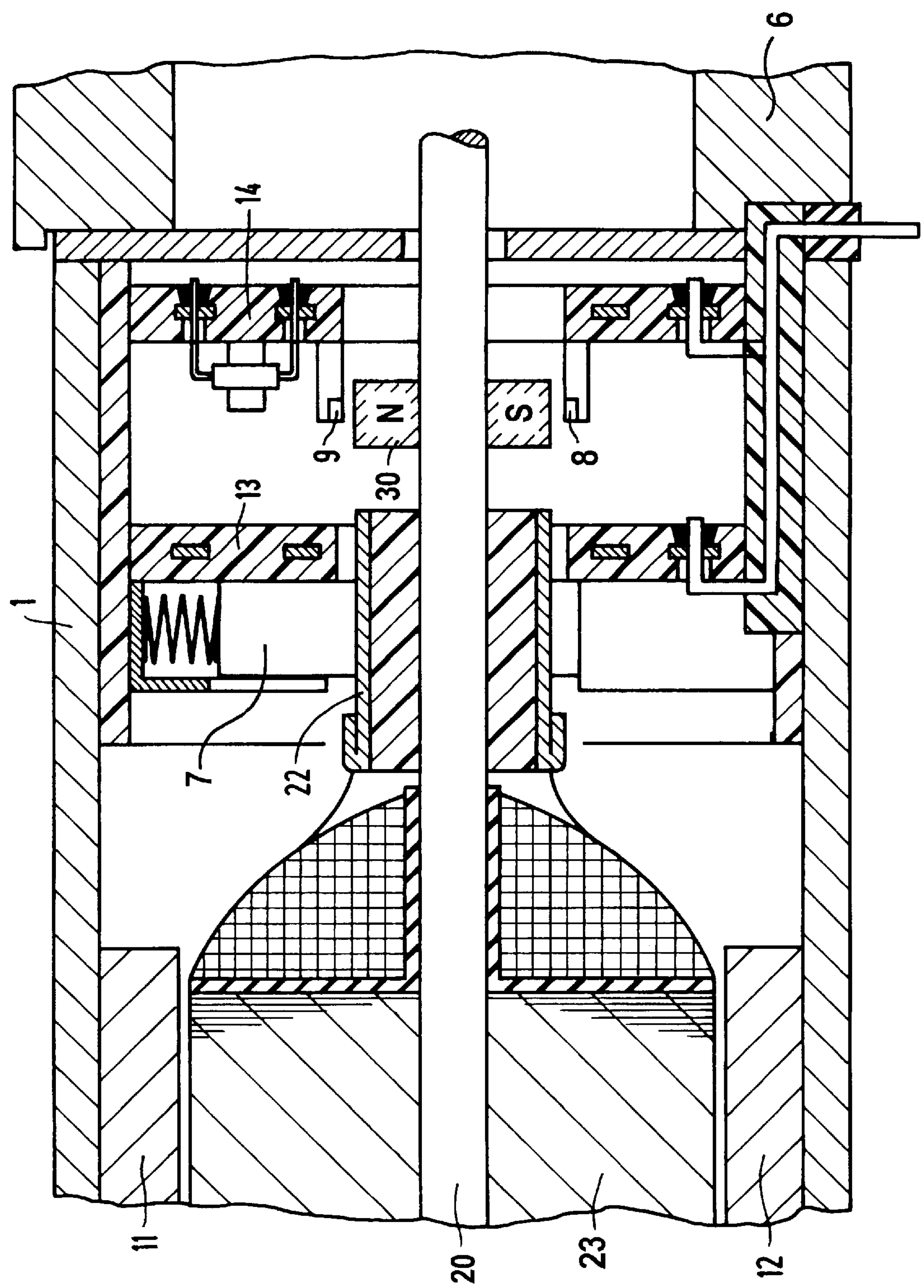
FIG. 1 is an axial, partial, sectional view of a commutator motor of a motor-vehicle gear-mechanism adjustment device with a magnet element, in the form of a rotor, which is attached directly to a rotor shaft in a known manner, to provide a rotational-speed and direction-of-rotation transmitter with associated stator-side Hall probes.

FIG. 1 is an axial, partial, sectional view of a commutator motor of a motor-vehicle gear-mechanism adjustment drive with a motor housing 1 and a gearbox casing 6 that adjoins the housing 1 axially. The motor housing 1 and the gearbox casing 6 can form part of, e.g., a motor vehicle window lifter or a motor vehicle sunroof drive. A rotor shaft 20 projects from the housing 1 into the gearbox casing 6 as an extended transmission shaft, and is fashioned, e.g., as a worm shaft. Permanent magnets 11, 12, provided for excitation purposes, are attached to the inner circumferential surface of the motor housing 1. A rotor packet 23, onto which a rotor winding is wound, is mounted on the rotor shaft 20, together with an axially premounted commutator 22 connected to the rotor winding. In order to feed in an electrical current, carbon brushes 7, which are secured to a brush mounting plate 13, slide over the laminations of the commutator 22.

In order to detect the rotational speed and/or the direction of rotation of the rotor shaft 20, a rotor 30 is attached, in a conventional manner, directly to the rotor shaft 20, for example by being press fitted and/or bonded onto the shaft. The rotor 30 is preferably of a two-poled design N, S, as indicated in the Figure. Hall probes 8, 9, associated with the rotor 30 on the stator side, are mounted on a stator-side printed circuit board 14.

In the conventional arrangement just described, it has become apparent that an adhesive connection between the rotor 30 and the rotor shaft 20 cannot ensure a sufficiently secure, permanent fit on the rotor shaft under all circumstances. This is so, in particular, when the mechanism is used under heavy-duty operating conditions and over relatively long operating times. A form fit of the rotor 30 withstands such loads better. However, due to the brittleness of the rotor 30, in particular when the rotor is manufactured as a sintered component, the use of a form fit is not an available option. As discussed in the "Description of the Related Art", above, these constraints were previously overcome through a design in which the actual magnet element in the form of the rotor was placed onto the rotor shaft without a form fit but rather merely with a sliding fit. The rotor was then fixed in its final operating position by means of a securing part that was mounted axially in front of and/or behind the magnet element. The securing part itself had to be pushed onto the rotor shaft with a form fit, and thus with a relatively high application of pressure. The securing part had to be structurally designed in such a way that it was able to ensure that the rotor would stay fixed mechanically and rotate along with the shaft.

According to the invention, as explained below with reference to FIGS. 2–5, a separate, radially resilient or elastic intermediate securing part is provided between the rotor 3 on the one hand and the rotor shaft 2 on the other. The securing part can, in particular, take the form of an O-ring 4 or of a quad ring 5. Given such a design, the rotational-speed and direction-of-rotation transmitter can be easily pushed over the rotor shaft 2 expediently with a sliding fit, without resort to a form fit, until its final mounting position is reached. There, the transmitter can then be secured with radial pressure, in a resilient or elastic fashion, onto the outer circumference of the elastic intermediate securing part. As in the conventional design, the rotational-speed and direction-of-rotation transmitter can, in particular, take the form of a rotor 3 having a polarization N, S, as illustrated in FIGS. 2–5. Indeed, given the inventive arrangment, even sintered components can be held securely without risk of damage to the rotor or to the shaft. Also, since the intermediate securing part is compressed between the rotor 3 and the rotor shaft 2, the resilient force of the securing part pressing outward and inward holds the rotor 3 firmly in place.

According to one refinement of the invention, the radially resilient or elastic intermediate securing part is fastened either to the rotor shaft or to the rotational-speed or direction-of-rotation transmitter, in the sense of a premounted unit, before the shaft and transmitter are mounted to one another. In order to facilitate premounting and/or fixing, according to a further refinement of the invention, an annular groove 31 is fashioned in the rotor 3, and/or an annular groove 21 is provided in the shaft 2. The annular groove 21 and/or 31 is dimensioned so that the O-ring 4 or quad ring 5 rests in a small, radial depth in an essentially positively locking fashion. Preferably, the annular groove 21 extends orthogonally to the axis of the shaft 2 and extends around the circumference of the rotor shaft 2. Analogously, the rotor 3, which is formed with an orifice for receiving the shaft 2, can be provided with an annular groove 31 extending radially outward from the orifice and into the body of the rotor 3, to form an annular recess.

Figure 2:
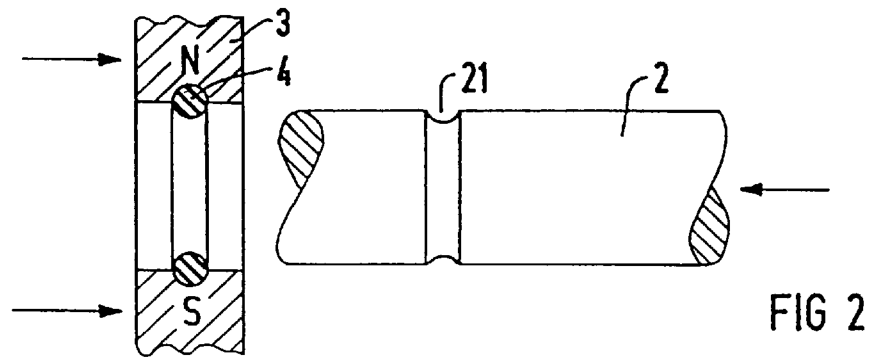
FIGS. 2–5 show, on the basis of an enlarged partial detail of FIG. 1, four different variants, according to the invention, of a means for mounting the rotor on the rotor shaft, where

FIG. 2 shows an O-ring 4, premounted and pressed to a specific radial depth into a circumferential annular groove 31 of the rotor 3, to provide a premounted unit. In a later assembly step, the radially inner contour of the O-ring 4 is snapped into a corresponding annular groove 21 of the rotor shaft 2, thereby bringing the rotor 3 into its operating position relative to the rotor shaft 2.

Figure 3:
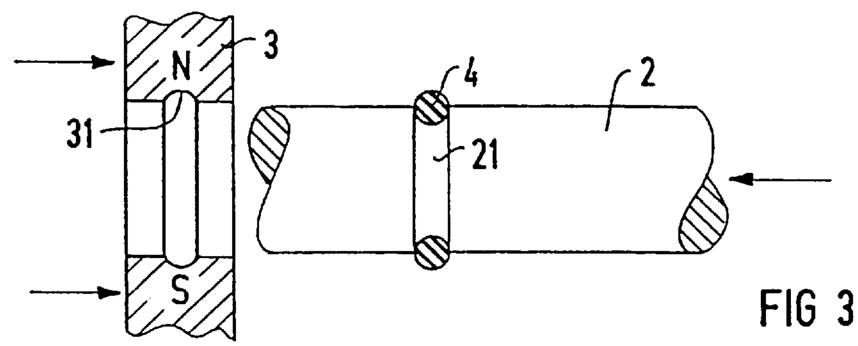

FIG. 3 shows a similar premounted arrangement of an O-ring 4 and the rotor shaft 2, the O-ring 4 being fitted onto the rotor shaft 2 to provide a premounted unit. In this embodiment, the radially inner contour is snapped, to a specific radial depth, into a corresponding contour of an annular groove 21 of the rotor shaft 2. To complete the mounting process, the rotor 3 is pressed over the O-ring 4 so that the O-ring 4 projects with its radially outer contour into a corresponding contour of an annular groove 31 which extends from the shaft orifice of the rotor 3 into the body of the rotor.

In either case (FIG. 2 or FIG. 3), the support faces between the rotor 3 on the one hand and the rotor shaft 2 on the other, as well as the interposed intermediate securing part, are all dimensioned such that, in the final, assembled state, there is sufficient pressure between the rotor 3 and the rotor shaft 2, owing to the elasticity of the intermediate securing part, to ensure secure and reliable positional and rotational fixing.

Figure 4:
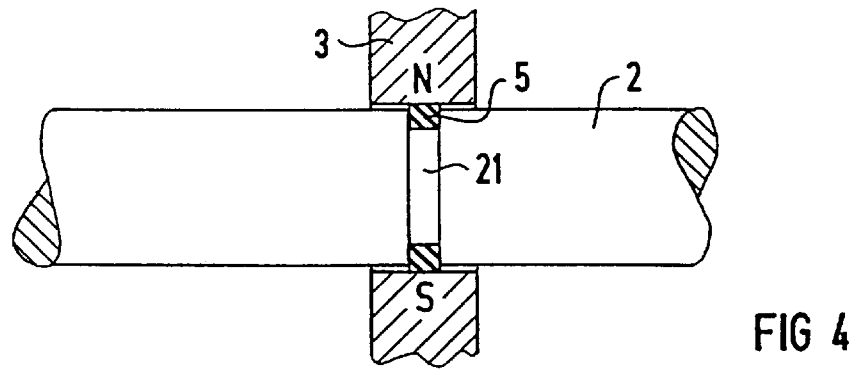

FIG. 4 shows a means of securing and fixing a rotor 3 on a rotor shaft 2 using a quad ring 5 as the intermediate securing part and a fixing aid with only a single annular groove 21 provided in the rotor shaft 2.

Figure 5:
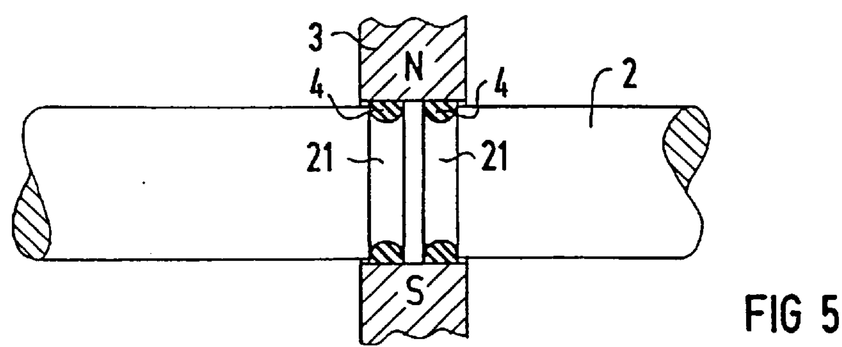

FIG. 5 shows a further refinement of the invention. Depending on the type of rotational-speed or direction-of-rotation transmitter to be used, two or more intermediate securing parts, arranged axially one behind the other, may be provided. In the embodiment shown in FIG. 5, the transmitter is again assumed to be a two-poled rotor 3, and the intermediate securing parts are in the form of two O-rings 4, 4. In the embodiment illustrated, only the rotor shaft 2 has annular grooves 21, 21, so that the compressed intermediate securing part constitutes a planar surface corresponding to the radially inward facing surface of the rotor 3. Analogously, in each of the previously described, illustrative embodiments, it is equally possible to provide only one annular groove for each intermediate securing part in either the rotor shaft or the rotor. In the case of low-power motors with only extremely small fixing forces, it is also possible, if appropriate, to dispense entirely with a premounting procedure and with fixing aids in the form of grooves or the like.

What is claimed is:

1. A sensor device for detecting at least one of a rotational speed and a direction of rotation of a rotor shaft, comprising:

a rotational-speed or direction-of-rotation transmitter secured to a circumference of the rotor shaft, and rotatable in unison with the rotor shaft; and a discrete, radially resilient intermediate securing part, consisting essentially of one or more rings made of elastic material, for securing said rotational-speed or direction-of-rotation transmitter rotationally and axially onto the rotor shaft exclusively by means of said securing part, said intermediate securing part being embraced on an outer circumferential side thereof by said rotational-speed or direction-of-rotation transmitter.

2. The sensor device as claimed in claim 1, wherein said rotational-speed or direction-of-rotation transmitter comprises a rotor.

3. The sensor device as claimed in claim 1, wherein said intermediate securing part comprises at least one discrete O-ring made of elastic material.

4. The sensor device as claimed in claim 3, wherein said discrete O-ring is made of rubber.

5. The sensor device as claimed in claim 1, wherein said intermediate securing part comprises a discrete quad ring made of elastic material.

6. The sensor device as claimed in claim 5, wherein said discrete quad ring is made of rubber.

7. The sensor device as claimed in claim 1, wherein said rotational-speed or direction-of-rotation transmitter comprises a rotor made of a polarized sintered magnetic ring.

8. The sensor device as claimed in claim 7, wherein said intermediate securing part is pressed, with an edge of said part, into a recess in a shaft orifice of said rotational-speed or direction-of-rotation transmitter, to form a premounted unit together with said transmitter.

9. The sensor device as claimed in claim 1, wherein said rotational-speed or direction-of-rotation transmitter comprises a rotor made of a polarized plastic-encapsulated ferrite magnetic ring.

10. The sensor device as claimed in claim 9, wherein said intermediate securing part is pressed, with an edge of said part, into a recess in a shaft orifice of said rotational-speed or direction-of-rotation transmitter, to form a premounted unit together with said transmitter.

11. The sensor device as claimed in claim 1, wherein said one or more rings of said intermediate securing part extend partially into one or more annular grooves, respectively, of the rotor shaft.

12. The sensor device as claimed in claim 1, wherein:

said rotational-speed or direction of rotation transmitter comprises one or more annular grooves; and said one or more rings of said intermediate securing part extend partially into said one or more annular grooves, respectively of said rotational-speed or direction-of-rotation transmitter.

13. The sensor device as claimed in claim 1, wherein said intermediate securing part is fitted onto the rotor shaft to form a premounted unit together with the rotor shaft.

14. The sensor device as claimed in claim 1, wherein said intermediate securing part comprises a plurality of separate, radially resilient rings arranged axially along the rotor shaft one behind another.

15. The sensor device as claimed in claim 1, wherein said rotational-speed or direction-of-rotation transmitter has an orifice with an inner circumferential surface dimensioned to slidingly fit over an outer circumferential surface of the rotor shaft, said inner circumferential surface being further dimensioned to fit onto said intermediate securing part such that said transmitter is axially and rotationally secured to the rotor shaft.

16. The sensor device as claimed in claim 1, wherein the rotor shaft is a transmission shaft of a gear-mechanism adjustment drive; said sensor device further comprising:

at least one stator-side pulse receiver associated with said rotational-speed or direction-of-rotation transmitter and mounted, in predetermined relationship to said rotational-speed or direction-of-rotation transmitter, on one of a printed circuit board or a brush plate of a commutator motor of the gear-mechanism adjustment drive.

17. The sensor device as claimed in claim 16, wherein said pulse receiver comprises at least one Hall probe.

18. The sensor device as claimed in claim 1, wherein said intermediate securing part is mounted coaxially with an axially central portion of said rotational-speed or direction-of-rotation transmitter, and axial ends of said transmitter extend axially along the rotor shaft beyond axial ends of said intermediate securing part.

19. A motor vehicle gear mechanism, comprising:

a rotor shaft having an outer circumferential surface and being rotatable around a shaft axis;

a rotor, forming part of a sensor device for transmitting rotational parameters of the rotor shaft, said rotor having a central orifice, for receiving the rotor shaft, formed by an inner circumferential surface of said rotor; and a discrete, radially resilient, intermediate securing part interposed between said rotor shaft and said rotor, and alone securing said rotor axially and rotationally to said rotor shaft; wherein said securing part is axially and rotationally fixed and compressed between said outer circumferential surface of said rotor shaft and said inner circumferential surface of said rotor.

20. The motor vehicle gear mechanism as claimed in claim 19, wherein said gear mechanism is provided for a motor vehicle window lifter.

21. The motor vehicle gear mechanism as claimed in claim 19, wherein said gear mechanism is provided for a motor vehicle sunroof drive.

22. The motor vehicle gear mechanism as claimed in claim 19, further comprising:

a stator; and a receiver, forming a further part of the sensor device, for transmitting the rotational parameters detected by said rotor, said receiver being mounted to said stator in predetermined relationship to said rotor.

23. The motor vehicle gear mechanism as claimed in claim 19, wherein said outer circumferential surface of said rotor shaft comprises at least one annular groove securely receiving said intermediate securing part.

24. The motor vehicle gear mechanism as claimed in claim 19, wherein said inner circumferential surface of said rotor comprises at least one annular groove securely receiving said intermediate securing part.

* * * * *